(12) United States Patent
Lei et al.

(10) Patent No.: US 11,964,268 B2
(45) Date of Patent: Apr. 23, 2024

(54) DETECTING APPARATUS

(71) Applicant: Zhejiang Orient Gene Biotech Co., Ltd, Zhejiang (CN)

(72) Inventors: Siyu Lei, Zhejiang (CN); Lili Shen, Zhejiang (CN); Jianqiu Fang, Zhejiang (CN)

(73) Assignee: ZHEJIANG ORIENT GENE BIOTECH CO., LTD, Zhejiang (CN)

( * ) Notice: Subject to any disclaimer, the term of this patent is extended or adjusted under 35 U.S.C. 154(b) by 135 days.

(21) Appl. No.: 17/576,364

(22) Filed: Jan. 14, 2022

(65) Prior Publication Data

US 2022/0226804 A1    Jul. 21, 2022

(30) Foreign Application Priority Data

Jan. 21, 2021 (CN) .......................... 202110084209.0
Jan. 21, 2021 (CN) .......................... 202120166211.8
(Continued)

(51) Int. Cl.
  *B01L 1/00*    (2006.01)
  *B01L 3/00*    (2006.01)
  *G01N 1/10*    (2006.01)

(52) U.S. Cl.
  CPC ............... *B01L 1/52* (2019.08); *B01L 3/5023* (2013.01); *B01L 3/523* (2013.01); *B01L 3/565* (2013.01);
(Continued)

(58) Field of Classification Search
  CPC .......... B01L 1/52; B01L 3/5023; B01L 3/523; B01L 3/565; B01L 2300/08;
(Continued)

(56) References Cited

U.S. PATENT DOCUMENTS

| 7,758,815 B2 * | 7/2010 | Hartselle | ............ | A61B 10/0096 |
| | | | | 422/68.1 |
| 10,064,606 B1 * | 9/2018 | Williams | ............ | A61B 10/0096 |
| | | (Continued) | | |

*Primary Examiner* — Samuel P Siefke
(74) *Attorney, Agent, or Firm* — Muncy, Geissler, Olds & Lowe, P.C.

(57) ABSTRACT

The present invention provides a detecting apparatus, including a storage chamber containing a treating fluid; wherein, the detecting apparatus is internally provided with a sharp-pointed portion; the storage chamber may make a movement relative to the sharp-pointed portion; the storage chamber will be pierced by the sharp-pointed portion during the moving process, such that the treating fluid in the storage chamber is released. The detecting apparatus further includes a collecting chamber; the released treating fluid may flow into the collecting chamber; the collecting chamber is disposed inside a first shell and used to contain a sample; an opening is disposed at an upper position of the first shell; the collecting chamber is internally provided with a testing element for detecting an analyte; the testing element is disposed on a carrier, and the carrier has a specific matching form with the collecting chamber. A buffer solution is disposed in an independent chamber of the detecting apparatus, and may be obtained at any time in need of detection and thus, is easy to be used. The carrier has a specific matching form with the collecting chamber in the first shell, such that the carrier has a definite and unique directional position after being inserted into the collecting chamber.

17 Claims, 12 Drawing Sheets

(30) Foreign Application Priority Data

Jan. 21, 2021 (CN) .......................... 202120168704.5
Jan. 21, 2021 (CN) .......................... 202120168705.X
Jan. 21, 2021 (CN) .......................... 202120168706.4

(52) U.S. Cl.
CPC ............ *G01N 1/10* (2013.01); *B01L 2300/08* (2013.01); *B01L 2300/0809* (2013.01); *B01L 2300/123* (2013.01)

(58) Field of Classification Search
CPC ....... B01L 2300/0809; B01L 2300/123; B01L 2200/16; B01L 2300/042; B01L 2300/047; B01L 2300/0672; B01L 2300/0825; B01L 2400/0683; G01N 1/10
See application file for complete search history.

(56) References Cited

U.S. PATENT DOCUMENTS

2006/0292034 A1\* 12/2006 Gould ................... B01L 3/5023
    422/400
2017/0001191 A1\* 1/2017 Biadillah ............... B65D 41/04

\* cited by examiner

DETECTING APPARATUS

CROSS-REFERENCE TO RELATED APPLICATION

This present application claims the priority of the following Chinese prior patent applications CN2021100842090 and filed on Jan. 21, 2021; CN2021201662118 and filed on Jan. 21, 2021; CN2021201687045 and filed on Jan. 21, 2021; CN202120168705X and filed on Jan. 21, 2021; and CN2021201687064 and filed on Jan. 21, 2021; description, drawings and claims of which are incorporated herein by reference as a portion of the present invention.

TECHNICAL FIELD

The present invention relates to the field of rapid detecting technologies in vitro; and in particular to an apparatus for collecting and detecting an analyte in a liquid sample in the field of rapid diagnosis, such as a urine and saliva collection and detection apparatus.

BACKGROUND

The following description is merely an introduction to the background art and not to limit the present invention.

At present, the detecting apparatus for detecting the presence or absence of an analyte in sample is widely used in hospitals or homes, and such apparatus for rapid diagnosis comprises one or more test strips, such as early pregnancy detection, drug abuse detection, etc. The apparatus is very convenient, and the detection result can be obtained from the test strip after one minute or no more than ten minutes.

The drug detection is widely used by drug control department, Public Security Bureau, drug rehabilitation centers, physical examination centers, the national conscription offices, etc. The drug detection is diverse and frequent. Some detections need to collect samples and then samples are detected in professional testing agency or testing laboratories, and some detections needs to be completed in the site in time, for example, persons who drive after drug use need to be tested on the spot (referred to as "Drug Driving"), to obtain the results in time. The sample for the drug detection may be urine, sweat, hair and a saliva.

In these detections, to obtain more accurate detecting results, the detecting personnel always add a buffer solution to a sample, thus maintaining a relatively stable pH value of a solution during the detection. Because the buffer solution will breed bacteria if it is exposed to the air at room temperature for a long time, and the bacterial metabolites will change the pH value of the buffer solution. Therefore, to avoid being in contact with the air, the buffer solution is generally not put to the detecting apparatus directly, but stored separately from the detecting apparatus in most cases, and added additionally during detection process. Such an operation way is very complex.

Therefore, it is necessary to improve the existing conventional detecting apparatuses, thus providing an apparatus for sample collection and detection in a simpler way.

SUMMARY

The objective of the present invention is to provide a detecting apparatus, thus solving the problem proposed in the background art.

To achieve the above objective, the technical solution of the present invention is as follows: a detecting apparatus, including a storage chamber containing a treating fluid, where, the detecting apparatus is internally provided with a sharp-pointed portion; the storage chamber may make a movement relative to the sharp-pointed portion; the storage chamber will be pierced by the sharp-pointed portion during the moving process, such that the treating fluid in the storage chamber is released.

Further, the detecting apparatus includes a collecting chamber, and the released treating fluid may flow into the collecting chamber.

Further, the collecting chamber is used for holding a sample and is disposed in a first shell; and an opening is disposed on an upper position of the first shell. Further, the collecting chamber is provided with a testing element for detecting an analyte.

Further, the testing element is disposed on a carrier, and the carrier has a specific matching form with the collecting chamber; the carrier may be inserted into the collecting chamber from the opening at the upper position of the first shell; and the carrier has a definite and unique directional position after being inserted into the collecting chamber.

Further, the collecting chamber is internally provided with clamping strips; and one carrier is fixed by two clamping strips; the carrier is attached to an inner wall of side of the collecting chamber on a side where the testing element is provided.

Further, each clamping strip has a smaller thickness in the upper end and has a greater thickness in the lower end; correspondingly, the carrier has a smaller thickness in the bottom position and has a greater thickness in the top position.

Further, a corner position of the collecting chamber is provided with filleted corners; correspondingly, filleted corners are also disposed on the carrier at both sides of the face provided with the testing element.

Further, the detecting apparatus further includes a sample collector for collecting a sample; where the sample collector includes a covering end, and the covering end may be used to cover an opening of the collecting chamber.

Further, the sample collector further includes a sampling end and a rod body; the sampling end is connected with an absorbing element; the rod body is used for connecting the covering end and the sampling end, and the rod body may be detachably connected with the covering end.

Further, a hole is disposed on the sample collector and/or collecting chamber, such that the collecting chamber is in air communication with the outside via the hole.

Further, a hollow tube extending towards the collecting chamber is disposed at the hole position of the covering end.

Further, the hole has a diameter less than 1 mm.

Further, liquid in the storage chamber is a buffer solution.

Further, a connecting head is disposed on one side of the covering end of the sample collector opposite to the rod body; the connecting head is hollow, such that the storage chamber may access to the hollow position.

Further, the sharp-pointed portion shows a protruding shape, and is disposed at the hollow position of the connecting head.

Further, the storage chamber is disposed in the second shell; the second shell is provided with a layer of sealing membrane, used for sealing liquid in the storage chamber; and the storage chamber enters into the hollow position of the connecting head, and the sharp-pointed portion may pierce the sealing membrane on the second shell, thus releasing the liquid in the storage chamber.

Further, the sharp-pointed portion is provided with a through hole.

Further, the second shell is provided with a second sealing ring, and a gap between the second shell and the connecting head may be filled by the second sealing ring may.

Further, the detecting apparatus further includes a cover body; the cover body is connected with the second shell; such a connection relation is detachable or non-detachable.

Further, the cover body may be mutually covered with the connecting head.

Further, paired threads are disposed on the cover body and the connecting head.

Further, a rotating portion is disposed on the cover body and an upper end of the second shell; the rotating portion is provided with a first bulge; and the cover body is provided with a connecting hole; the rotating portion may be inserted into the connecting hole and buckled on the connecting hole via the first bulge, such that the second shell may rotate on the connecting hole.

Further, the detecting apparatus further includes a protecting element used for limiting excessive closure of the cover body.

Further, the protecting element further includes a protecting element used for limiting excessive closure of the cover body; the protecting element includes a supporting section, the supporting section is sleeved on the connecting head; a lower end of the supporting section may be abutted against an upper surface of the covering end, and an upper end of the supporting section may be abutted against the cover body.

Further, the supporting section is hollow and cylindrical, and is sleeved on the connecting head.

Further, a first notch is disposed on the supporting section of the protecting element.

Further, the protecting element is elastic.

Further, the protecting element further includes a holding portion provided with stripes; the holding portion is connected with the supporting section; and the connection position between the holding portion and the supporting section is just directly situated facing the first notch.

Further, a second bulge bulging inwards is disposed in the protecting element at the bottom position of the supporting section, and the second bulge is in an annular shape; correspondingly, an annular structure is also disposed in the connecting head close to the bottom position; the second bulge may be clamped into a gap between the annular structure and the upper surface of the covering end.

Further, the annular structure is provided with a second notch; correspondingly, a third bulge directly situated facing the first notch is disposed inside the supporting section of the protecting element; and the third bulge may be embedded into the second notch.

Further, the covering end is in a rectangular shape; and the second notch is located at one side close to the long edge of the covering end.

Further, a blocking wall is disposed on the supporting section of the protecting element and is arc-shaped.

Further, an inner diameter of the protecting element located in the blocking wall is greater than the inner diameter of the protecting element located in the supporting section.

Further, a buckle is disposed inside the blocking wall; a circle of flange is disposed at a bottom position of the cover body; and the flange of the cover body may access to the blocking wall and be buckled below the buckle.

Further, the upper end of the flange is horizontal and the lower end of the buckle is also horizontal; the upper end of the buckle is slope-shaped, and a chamfer is disposed at a lower position of the flange of the cover body.

To sum up, the present invention has the following beneficial effects: a buffer solution is disposed in an independent chamber of the detecting apparatus, and may be obtained at any time in need of detection and thus, is easy to be used. The carrier has a specific matching form with the collecting chamber in the first shell, such that the carrier has a definite and unique directional position after being inserted into the collecting chamber; the sample collector is provided with a hole connecting the collecting chamber with the outside, capable of solving the covering problem caused by air pressure in the use process of the detecting apparatus. Meanwhile, a hollow tube extending towards the collecting chamber is disposed at the hole position of the covering end, capable of avoiding the leakage of the sample. The bottom position of the collecting chamber is provided with an extruding portion which opens upwards and presents a frustoconical shape; when the absorbing element on the sampling end contacts with the extruding portion to extrude the sample, the absorbing element extrudes the bottom of the extruding portion, meanwhile, the frustoconical opening can further extrude the side portion of the absorbing element, which improves the extruding efficiency and can release more liquid samples, and moreover can gather the sample to some extent. The detecting apparatus further includes a protecting element used for limiting excessive closure of the cover body, which can prevent the storage chamber from being pierced by the sharp-pointed portion before detection. A plurality of grooves are disposed on the outer surface of the carrier and can be used for mounting different testing elements, thus achieving multiple tests for once.

DETAILED DESCRIPTION OF THE EMBODIMENTS

Figure 1:
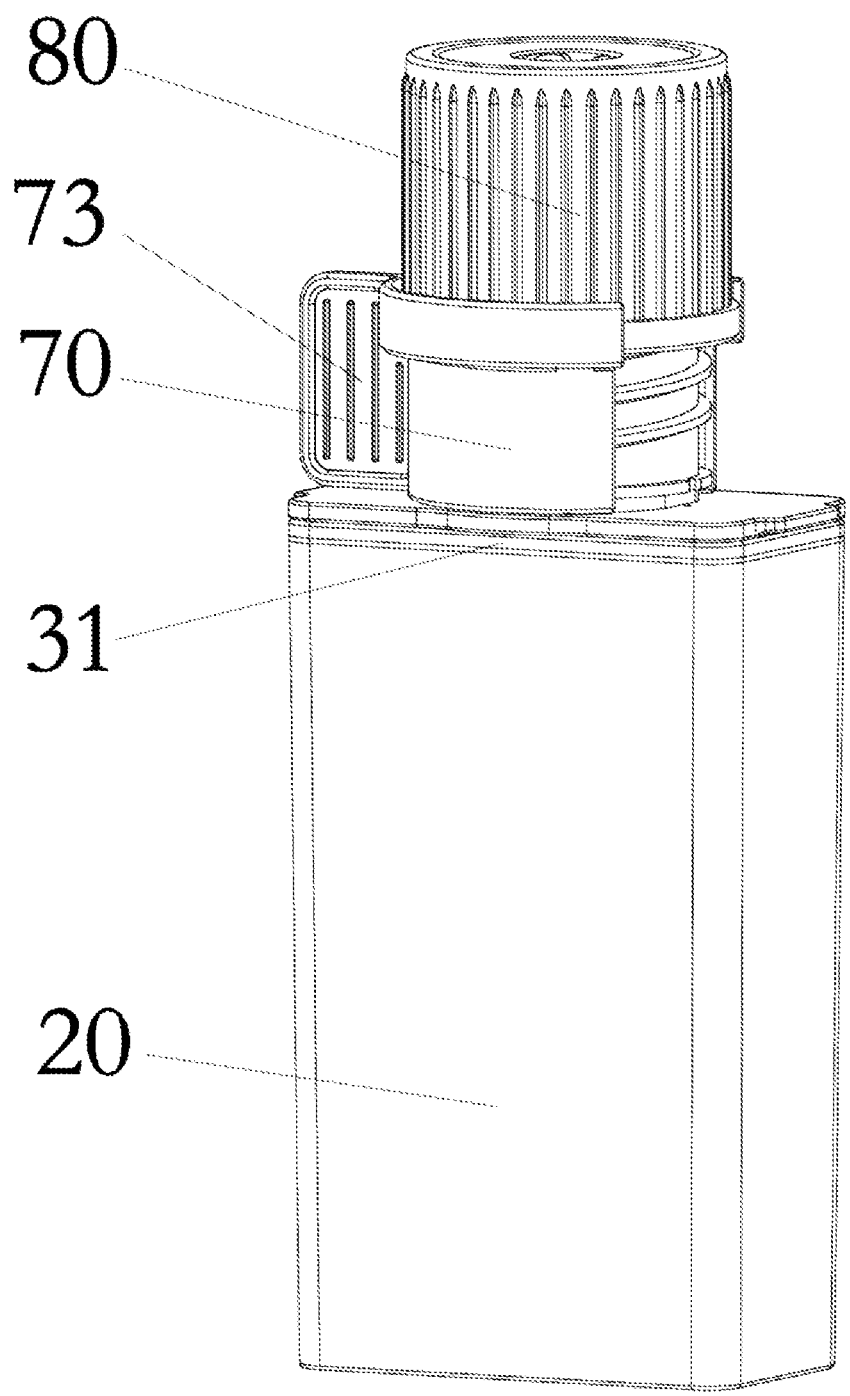
FIG. 1 is a schematic diagram showing an overall structure of a detecting apparatus.
Figure 2:
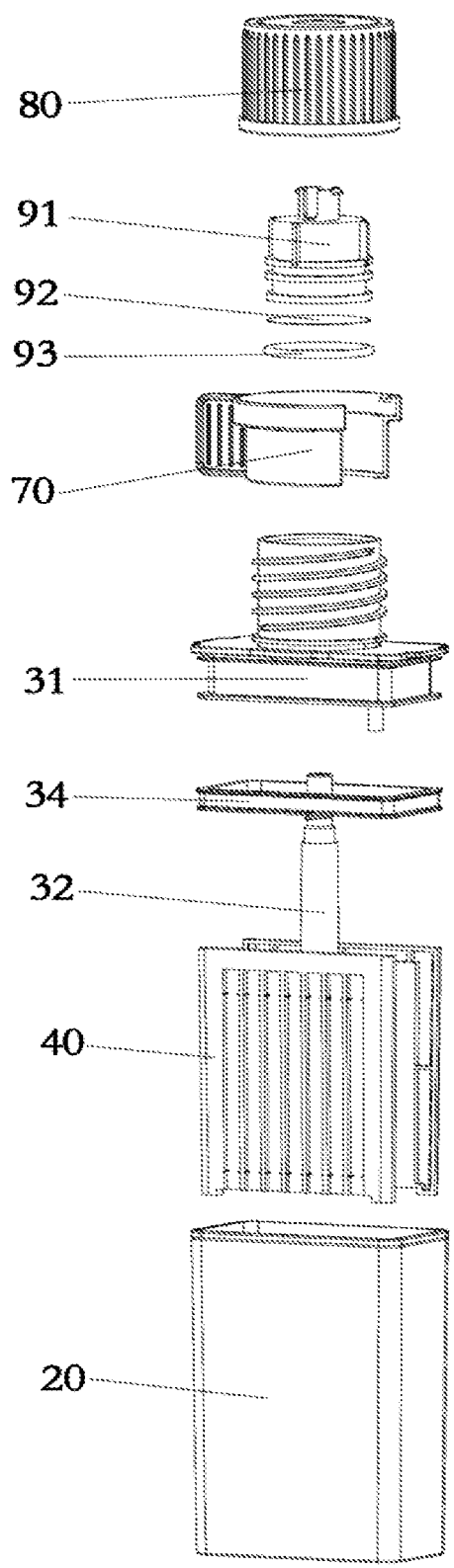
FIG. 2 is a complete explosive diagram of the detecting apparatus.

The structures or technical terms used in the present invention are further described in the following. Unless otherwise indicated, they are understood or interpreted according to ordinary terms and definitions in the art.

Detection

Detection denotes assaying or testing whether a substance or material exists, for example, but not limited to, chemicals, organic compounds, inorganic compounds, metabolites, drugs or drug metabolites, organic tissues or metabolites of organic tissues, nucleic acid, proteins or polymers. Moreover, detection denotes testing the number of a substance or material. Further, assay also denotes immunoassay, chemical detection, enzyme detection and the like.

Samples

The samples that can be detected by the detecting apparatus or collected samples of the present invention include biological liquid (e.g. case liquid or clinical samples), liquid samples or liquid specimens, or fluid samples or fluid specimens. These samples or specimens can be derived from solid or semi-solid samples, including fecal materials, biological tissues and food samples. Solid or semi-solid samples can be converted to liquid samples using any appropriate method, such as mixing, crushing, macerating, incubating, dissolving or digesting the solid samples in a suitable solution (such as water, phosphate solution or other buffer solutions) with the enzymolysis. "Biological samples" include samples from animals, plants and food, such as urine, saliva, blood and its components, spinal fluids, vaginal secretion, sperms, excrement, sweat, secreta, tissues, organs, tumors, cultures of tissues and organs, cell cultures and media from human or animals. The preferred biological sample is urine, preferably, the biological sample is saliva. Food samples comprise food processed substances, final products, meat, cheese, liquor, milk and drinking water; and plant samples comprise samples from any plants, plant tissues, plant cell cultures and media. "Environmental samples" are derived from the environment (for example, liquid samples, wastewater samples, soil texture samples, underground water, seawater and effluent samples from lakes and other water bodies). Environmental samples may further include sewage or other waste water.

Any analyte can be detected using the appropriate detecting element or testing element of the present invention. Preferably, the present invention is used to detect small drug molecules in saliva and urines. Of course, any form of samples, either initially solid or liquid, can be collected by the collection apparatus in the invention, as long as the liquid or liquid samples can be absorbed by the absorbing element. The absorbing element is generally prepared from a water absorbent material and is initially dry. It can absorb liquid or fluid specimens by capillary or other characteristics of the absorbing element material. The absorbent material can be any liquid absorbing material such as sponge, filter paper, polyester fiber, gel, non-woven fabric, cotton, polyester film, yarn, etc. Of course, the absorbing element is not necessarily prepared by an absorbent material but may be prepared by a non-water absorbent material. But the absorbing element has pores, threads, and cavities and specimens may be collected on these structures.

Downstream and Upstream

Downstream or upstream is divided according to a flow direction of a liquid, generally, a liquid flows to a downstream area from an upstream area. The downstream region receives liquid from the upstream region, and also, liquid can flow to the downstream region along the upstream region. Here the regions are often divided according to the flow direction of liquid. For example, on some materials that use capillary force to promote liquid to flow, liquid can flow against the gravity direction, at this time, the upstream and downstream regions are still divided according to the flow direction of liquid.

Gas Flow or Liquid Flow

Gas flow or liquid flow means that liquid or gas can flow from one place to another place. The flow process may pass through some physical structures, to play a guiding role. The "passing through some physical structures" here means that liquid passes through the surface of these physical structures or their internal space and flows to another place passively or actively, where passivity is usually caused by external forces, such as the flow of the capillary action. The flow here may mean flow of gas or liquid due to self action (gravity or pressure), or passive flow. Here, the flow does not mean that a liquid or a gas is necessarily present, but indicates a relationship or state between two objects under some circumstances. In case of presence of liquid, it can flow from one object to another. Here it means the state in which two objects are connected. In contrast, if there exists no gas flow or liquid flow state between two objects, and liquid exists in or above one object but cannot flow into or on another object, it is a non-flow, non-liquid or non-gas flow state.

Testing Element

The "testing element" used herein refers to an element that can be used to detect whether a sample or a specimen contains an interested analyte. Such testing can be based on any technical principles, such as immunology, chemistry, electricity, optics, molecular science, nucleic acids, physics, etc. The testing element can be a lateral flow test strip that can detect a variety of analytes. Of course, other suitable testing elements can also be used in the present invention.

Various testing elements can be combined for use in the present invention. One form of the testing elements is test paper. The test papers used for analyzing the analyte (such as drugs or metabolites that show physical conditions) in samples can be of various forms such as immunoassay or chemical analysis. The analysis mode of non-competition law or competition law can be adopted for test papers. A test paper generally contains a water absorbent material that has a sample application area, a reagent area and a testing area. Samples are added to the sample application area and flow to the reagent area through capillary action. If analyte exists in the reagent area, samples will bind to the reagent. Then, samples continue to flow to the testing area. Other reagents such as molecules that specifically bind to analyte are fixed in the testing area. These reagents react with the analyte (if any) in the sample and bind to the analyte in this area, or bind to a reagent in the reagent area. Marker used to display the detection signal exists in the reagent area or the detached mark area.

Typical non-competition law analysis mode: if a sample contains analyte, a signal will be generated; and if not, no signal will be generated. Competition law: if no analyte exists in the sample, a signal will be generated; and if analyte exists, no signal will be generated.

The testing element can be a test paper, which can be water absorbent or non-absorbing materials. The test paper can contain several materials used for delivery of liquid samples. One material can cover the other material. For example, the filter paper covers the nitrocellulose membrane. One area of the test paper can be of one or more materials, and the other area uses one or more other different materials. The test paper can stick to a certain support or on a hard surface for improving the strength of holding the test paper.

Analyte is detected through the signal generating system. For example, one or more enzymes that specifically react with this analyte is or are used, and the above method of fixing the specifically bound substance on the test paper is used to fix the combination of one or more signal generating systems in the analyte testing area of the test paper. The substance that generates a signal can be in the sample application area, the reagent area or the testing area, or on the whole test paper, and one or more materials of the test paper can be filled with this substance. The solution containing a signifier is added onto the surface of the test paper, or one or more materials of the test paper is or are immersed in a signifier-containing solution; and the test paper containing the signifier solution is made dry.

Each area of the test paper can be arranged in the following way: sample application area, reagent area, testing area, control area, area determining whether the sample is adulterated, and liquid sample absorbing area. The control area is located behind the testing area. All areas can be arranged on a test paper that is only made of one material. Also, different areas may be made of different materials. Each area can directly contact the liquid sample, or different areas are arranged according to the flow direction of liquid sample; and a tail end of each area is connected and overlapped with the front end of the other area. Materials used can be those with good water absorption such as filter papers, glass fibers or nitrocellulose membranes. The test paper can also be in the other forms.

The nitrocellulose membrane test strip is commonly used, that is, the testing area includes a nitrocellulose membrane on which a specific binding molecule is fixed to display the detecting result; and other test strips such as cellulose acetate membrane or nylon membrane test strips can also be used. For example, the test strips and similar apparatuses with test strips disclosed in the following patents can be applied to the testing elements or detecting apparatuses in this invention for analyte detection, such as the detection of the analyte in the samples: U.S. Pat. Nos. 4,857,453; 5,073,484; 5,119,831; 5,185,127; 5,275,785; 5,416,000; 5,504,013; 5,602,040; 5,622,871; 5,654,162; 5,656,503; 5,686,315; 5,766,961; 5,770,460; 5,916,815; 5,976,895; 6,248,598; 6,140,136; 6,187,269; 6,187,598; 6,228,660; 6,235,241; 6,306,642; 6,352,862; 6,372,515; 6,379,620, and 6,403,383 The test strips and similar apparatus provided with a test strip disclosed in the above patent literatures may be applied in the testing element or detecting apparatus of the present invention for the detection of an analyte, for example, the detection of an analyte in a sample.

The test strips applied in the present invention may be the so-called lateral flow test strips; moreover, the specific structure and detection principle of these test strips are common general knowledge in the art. Common test strip includes a sample collecting area or a sample application area, a labeled area, a testing area and a water absorbing area; the sample collecting area includes a sample receiving pad, the labeled area includes a labeled pad, the water absorbing area may include a water absorbing pad; where the testing area includes necessary chemical substances for detecting the presence or absence of analyte, such as immunoreagents or enzyme chemical reagents. The nitrocellulose membrane test strip is commonly used, that is, the testing area includes a nitrocellulose membrane on which specific binding molecule is fixed to display the detecting result; and other test strips such as cellulose acetate membrane or nylon membrane test strips can also be used. Of course, in the downstream of the testing area, there may also be a detecting result control area; generally, test strips appear on the control area and the testing area in the form of a horizontal line, that is a detection line or a control line, and such test strips are conventional. Of course, they can also be other types of test strips using capillary action for detection. In addition, there are often dry chemical reagent components on the test strip, for example immobilized antibody or other reagents. When the test strip meets liquid, the liquid flows along the test strip with the capillary action, and the dry reagent components are dissolved in the liquid, then the liquid flows to the next area, the dry reagents are treated and reacted for necessary detection. The liquid flow mainly relies on the capillary action. Here, all of them can be applied to the detecting apparatus of the present invention or can be disposed in contact with the liquid samples in the detection chamber or used to detect the presence or absence of analyte in the liquid samples that enter the detection chamber, or the quantity thereof.

Figure 3:
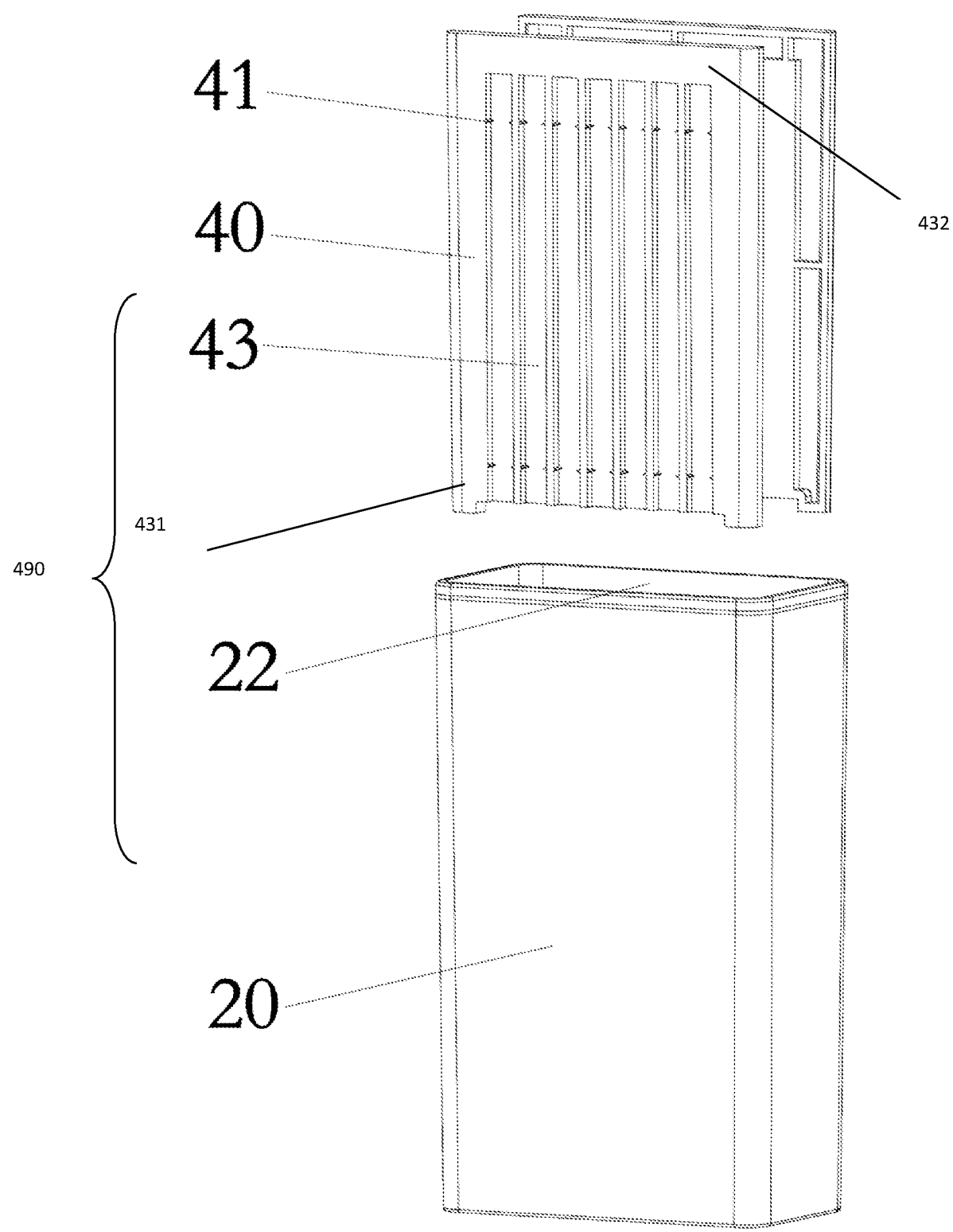
FIG. 3 is a schematic diagram showing that a carrier is mounted in a first shell.
Figure 4:
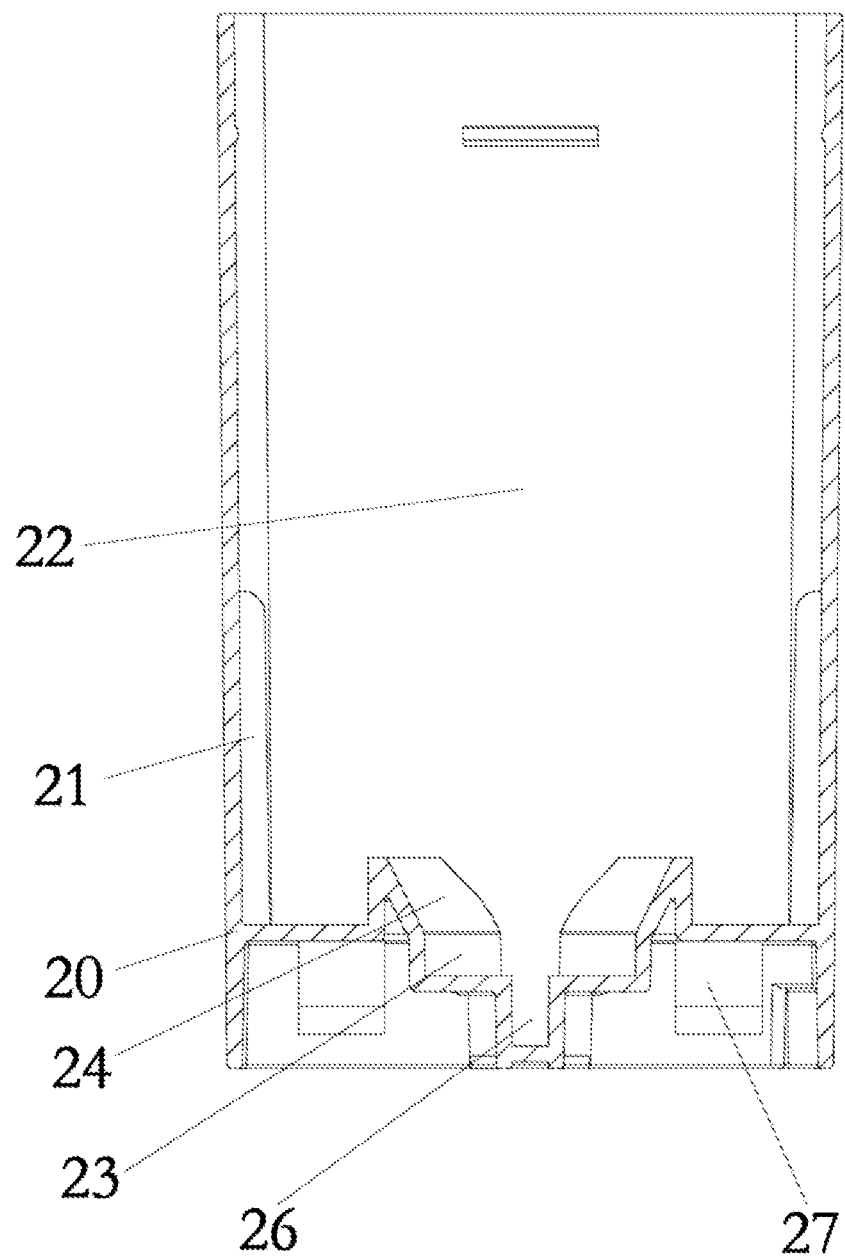
FIG. 4 is a sectional diagram showing the front of the first shell.

In addition to the foregoing test strip or lateral flow test strip which is used to contact with the liquid to test whether the liquid samples contain analytes, in some preferred embodiments, the testing element is disposed on some carriers 40, as shown in FIG. 3, for example, on some carriers having a plurality of grooves 43; the testing element is located in the groove 43. In some embodiments, the carrier 40 includes a grooved area provided with a testing element; and the area is provided with a plurality of grooves, and each groove may be provided with a test stripe, and each test stripe may be used to detect one or more analytes. The carrier 40 has a matched form with the collecting chamber 22, for example, the collecting chamber 22 is a square chamber here; correspondingly, a tabular carrier 40 may be put in the collecting chamber 22, and a plurality of grooves 43 are disposed on the outer surface of the carrier 40; and these grooves 43 are evenly distributed in an array way; the testing element is put to the groove 43, and the testing element may be a test stripe; sharp corners 41 are disposed at both sides of the groove 43; and the sharp corner 41 may clamp the test stripe in the groove 43 and mainly plays the role of fixing the test stripe. In some embodiments, after the testing element is disposed in the groove 43 of the carrier 40, the carrier 40 is covered with a transparent film, to seal the grooved area of the carrier 40. In addition, it is easy to observe the final test results on the testing area from the transparent film. The transparent film may be a transparent plastic sheet, which is only transparent in the testing area.

Generally, the test stripe includes a sample application area, a labeled area, and a testing area; the sample application area is put to a position near the bottom of the carrier, and then is slightly exposed to the groove, for example, 2-3 mm; the preserved sample application area is used to absorb the fluid samples flowing into the bottom of the collecting chamber 22. Generally, the sample application area is located upstream the labeled area, and the labeled area is located upstream the testing area.

Carrier and Collecting Chamber

Figure 5:
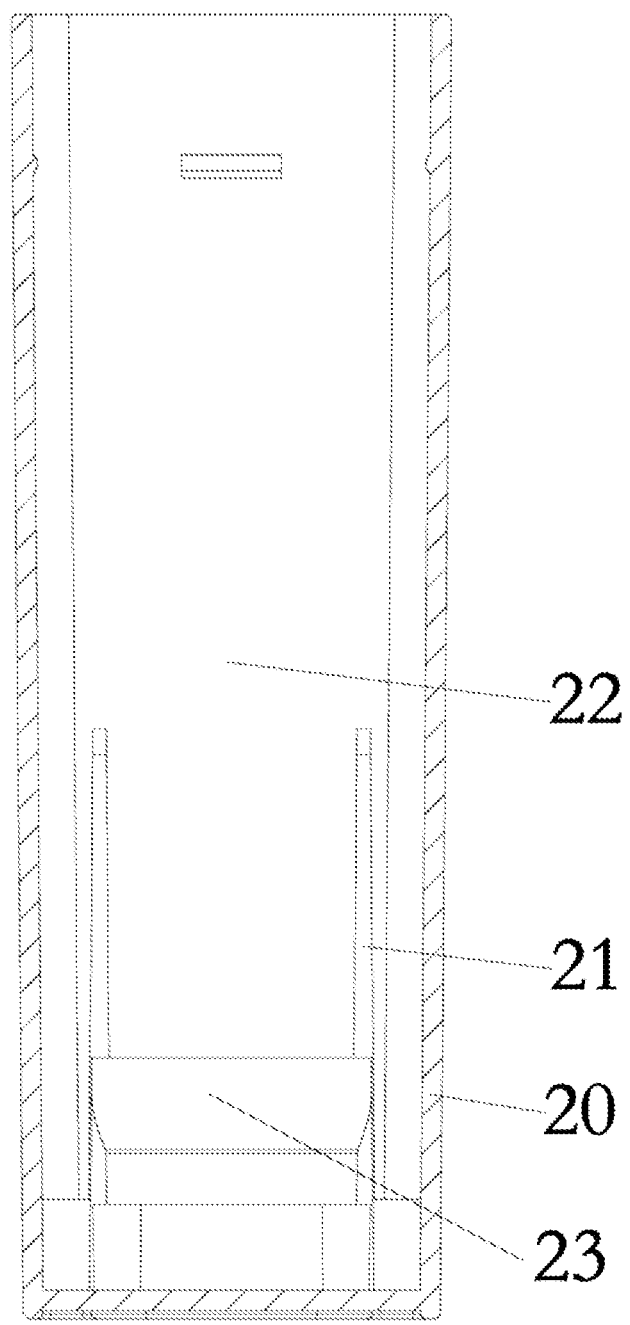
FIG. 5 is a sectional diagram showing the side of the first shell.
Figure 8:
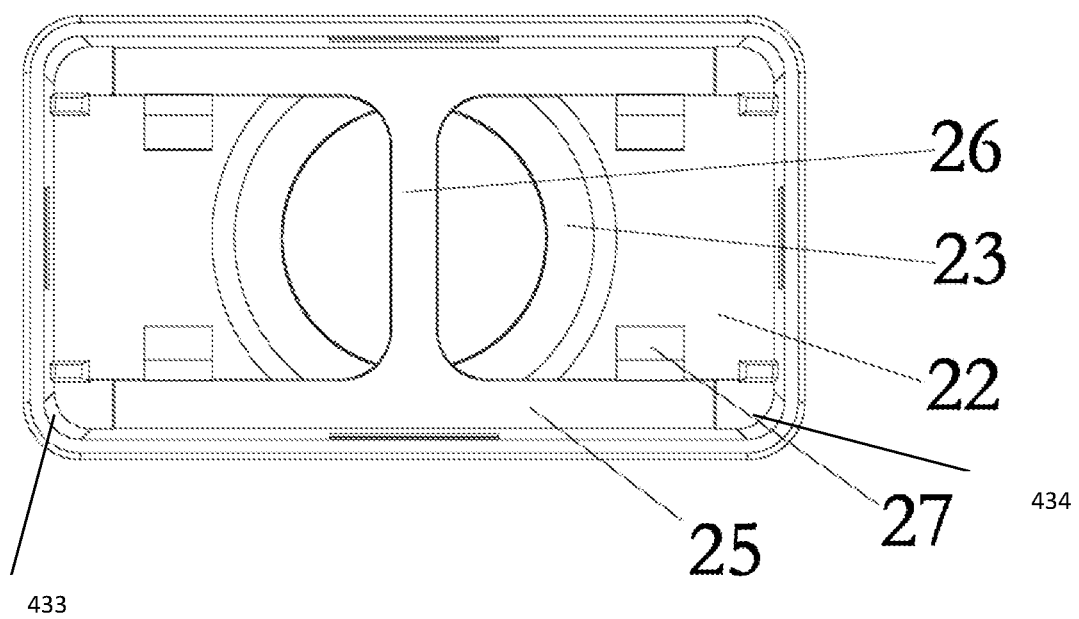
FIG. 8 is a top view of the first shell.

The collecting chamber is a place for holding a sample; the first shell 20 is provided with a collecting chamber 22, and the collecting chamber 22 includes an opening at the upper position of the first shell 20; and the carrier 40 is inserted into the collecting chamber 22 from the opening at the upper position of the first shell 20. In some embodiments, the carrier 40 has a specific matched form with the collecting chamber 22. Such a matched form renders the carrier to have a definite and unique directional position after being inserted into the collecting chamber. Specifically, referring to FIG. 5, the collecting chamber 22 is internally provided with clamping strips 21, and one carrier 40 is preferably fixed by two clamping strips 21; the two clamping strips 21 may limit the carrier 40 within the collecting chamber 22 by limiting both sides of the carrier 40 and allow one side of the carrier 40 provided with the test stripe to be attached to an inner wall of the side of the collecting chamber 22; the first shell 20 is preferably made of transparent materials, such that the detecting personnel may directly read the detection result from the carrier 40. Further, referring to FIG. 5, the clamping strip 21 has a smaller thickness in the upper end and has a greater thickness in the lower end, such that the distance between the clamping strip and side wall of the collecting chamber is inconsistent and changes from wide to narrow; correspondingly, the carrier 40 has a smaller thickness in the bottom position 431 and has a greater thickness in the top position 432. Due to the limitation of thickness, such a design mode renders that the carrier 40 may not be upside down (the top portion is downwards and bottom portion is upwards) inserted into the collecting chamber 22, but inserted into the collecting chamber via an only way, thus avoiding wrong assembly during assembling process; particularly, such a design mode is especially useful in case of automatic assembly by a machine. Moreover, a corner position of the collecting chamber 22 is provided with filleted corners 433,434 (FIG. 8). Correspondingly, filleted corners are also disposed on the carrier 40 at both sides of the face provided with the test stripe, such that the carrier 40 may slide down only when the side of the carrier 40 provided with the test stripe is attached to the inner wall of the collecting chamber 22. When the side of the carrier 40 opposite to the test stripe is attached to the inner wall of the collecting chamber 22 to slide down, both sides of the carrier 40 opposite to the test stripe are non-filleted corners (both sides are sharp corners); during the sliding process, the non-filleted corners will be not matched with the filleted corners in the corner position of the collecting chamber 22, such that the carrier may not slide to the bottom and thus is stuck and cannot get into the collecting chamber. Such configuration mode achieves the specific matching form between the carrier 40 and the collecting chamber 22. Further, such specific mode limits the specific inserting direction of the front side and the reverse side of the carrier into the collecting chamber, and only allows the side of the carrier provided with the test stripe to be attached and close to the side wall.

Analyte

Examples that can use the analyte related to this invention include small-molecule substance, including drugs (such as drug abuse). "Drug of Abuse" (DOA) refers to using a drug (playing a role of paralyzing the nerves usually) not directed to a medical purpose. Abuse of these drugs will lead to physical and mental damage, produce dependency, addiction and/or death. Examples of DOA include cocaine, amphetamine AMP (for example, Black Beauty, white amphetamine table, dextroamphetamine, dextroamphetamine tablet, and Beans); methylamphetamine MET (crank, methamphetamine, crystal, speed); barbiturate BAR (e.g., Valium□, Roche Pharmaceuticals, Nutley, and New Jersey); sedative (namely, sleep adjuvants); lysergic acid diethylamide (LSD); depressor (downers, goofballs, barbs, blue devils, yellow jackets, methaqualone), tricyclic antidepressants (TCA, namely, imipramine, Amitryptyline and Doxepin); methylene dioxymetham-phetamine (MDMA); phencyclidine (PCP); tetrahydrocannabinol (THC, pot, dope, hash, weed, and the like). Opiates (namely, morphine MOP or, opium, cocaine COC; heroin, oxycodone hydrochloride); antianxietics and sedative hypnotics, antianxietics are drugs for alleviating anxiety, tension, fear, stabilizing emotion and having hypnosis and sedation, including benzodiazepines (BZO), non-typical BZs, fusion dinitrogen NB23Cs, benzoazepines, ligands of a BZ receptor, open-loop BZs, diphenylmethane derivatives, piperazine carboxylates, piperidine carboxylates, quinazoline ketones, thiazine and thiazole derivatives, other heterocyclic, imidazole sedatives/analgesics (e.g., oxycodone hydrochloride OXY, metadon MTD), propylene glycol derivatives, mephenesin carbamates, aliphatic compounds, anthracene derivatives, and the like. The detection device of the present invention may be used for detecting drugs which belong to medical use but is easy to be taken excessively, such as tricyclic antidepressants (Imipramine or analogues), acetaminophen and the like. These medicines will be resolved into micromolecular substances after being absorbed by human body, and these micromolecular substances will exist in blood, urine, saliva, sweat and other body fluids or in some of the body fluids.

For example, the analyte detected by the present invention includes but not limited to creatinine, bilirubin, nitrite, proteins (nonspecific), hormones (for example, human chorionic gonadotropin, progesterone, follicle-stimulating hormone, etc.), blood, leucocyte, sugar, heavy metals or toxins, bacterial substances (such as, proteins or carbohydrates against specific bacteria, for example, *Escherichia coli.* 0157:H7, *Staphylococcus, Salmonella, Fusiformis* genus, *Camyplobacter* genus, *L. monocytogenes, Vibrio*, or *Bacillus cereus*) and substances associated with physiological features in a urine sample, such as, pH and specific gravity. The chemical analysis of any other clinical urine may be conducted by means of a lateral cross-flow detection way and in combination with the device of the present invention.

Flow of Liquid

Generally, the flow of liquid means that liquid flows from one place to another place. Under normal circumstances, liquid flows from a high place to a low place due to gravity in the natural world. The flow of liquid herein relies on an external force, i.e. gravity, which can be called a flow due to gravity. In addition to gravity, liquid can also flow from a low place to a high place by overcoming the gravity. For example, liquid flows from a low place to a high place due to extraction, oppression or pressure, or by overcoming its gravity due to pressure. For example, in this example, if there is a liquid sample in the collecting chamber 22, the liquid sample is gathered to the bottom of the collecting chamber 22 under the effect of gravity; when the liquid sample at the bottom of the collecting chamber 22 is in contact with the lower end of the test paper on the carrier 40, the liquid sample begins to flow from bottom to top by relying on capillary force for detection.

Sample Collector and Collecting Chamber

Figure 6:
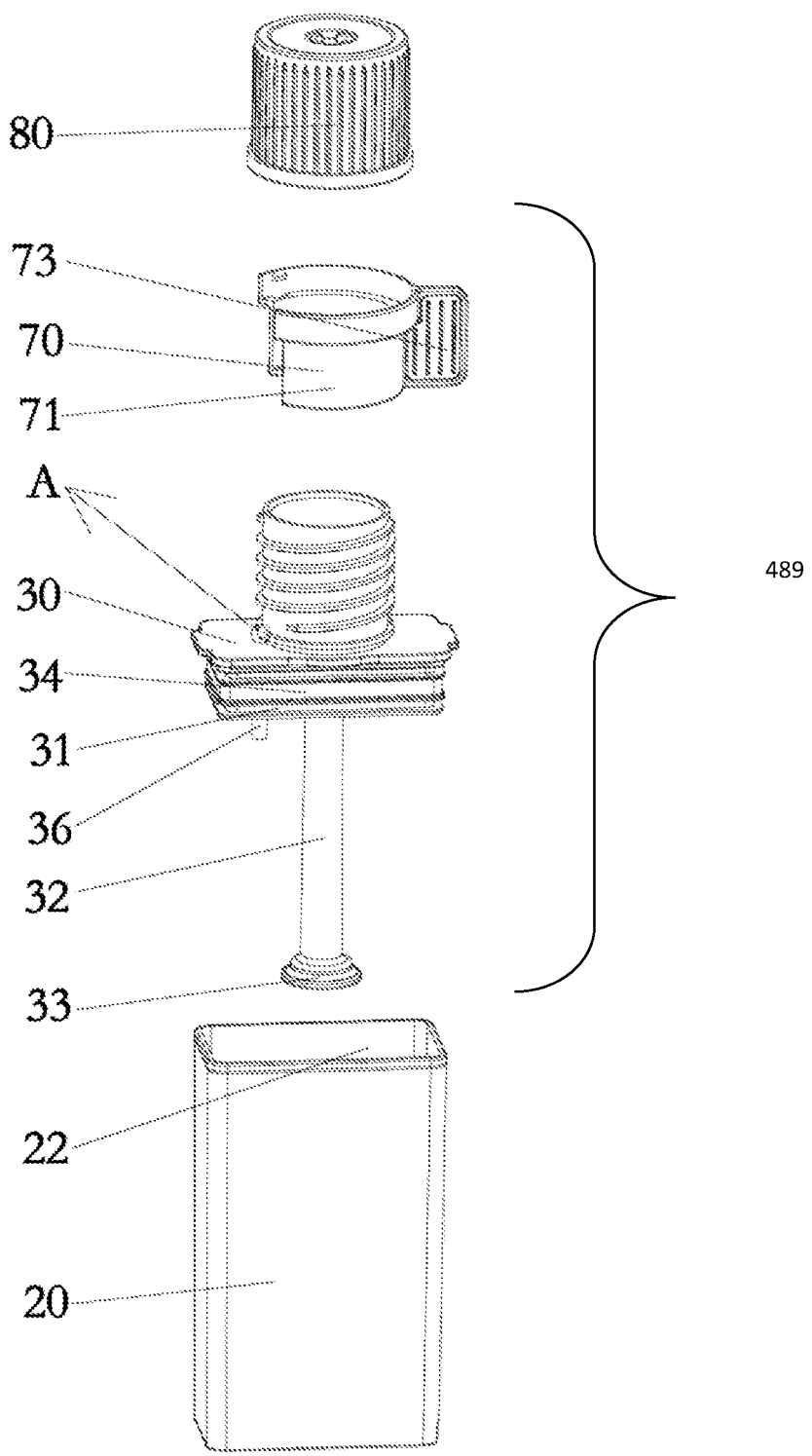
FIG. 6 is an explosive diagram of the detecting apparatus in use.

A sample collector is used to collect samples; as shown in FIG. 6, the sample collector 30 includes a covering end 31, a rod body 32, a sampling end 33; the covering end 31 may be used to cover the opening of the collecting chamber 22 to prevent the leakage of the sample in the collecting chamber 22; the sampling end 33 is used to connect with an absorbing element (omitted); the absorbing element may be a non-poisonous sponge with strong water absorption and may be bonded with the sampling end 33 via a special glue; when the sample collector 30 is inserted into the collecting chamber 22 along the opening of the collecting chamber 22, the absorbing element (not shown) on the sampling end 33 extrudes the bottom of the collecting chamber 22, such that the sample is squeezed out from the absorbing element. As the sample collector 30 moves down constantly, the liquid sample in the absorbing element is constantly squeezed out until the opening of the collecting chamber 22 is completely covered by the covering end 31. At this time, the sample collector 30 cannot keep moving down, and the absorbing element is also in an extruded state. The covering end 31 is matched with the opening of the collecting chamber 22 in shape, such that the opening of the collecting chamber may be sealed (liquid sealed) by the cover body.

Preferably, the upper end of the rod body 32 may be detachably connected with the covering end 31, for example, connected by a screw-thread fit way. For the convenience of production, integration of injection molding may be available certainly.

Figure 7:
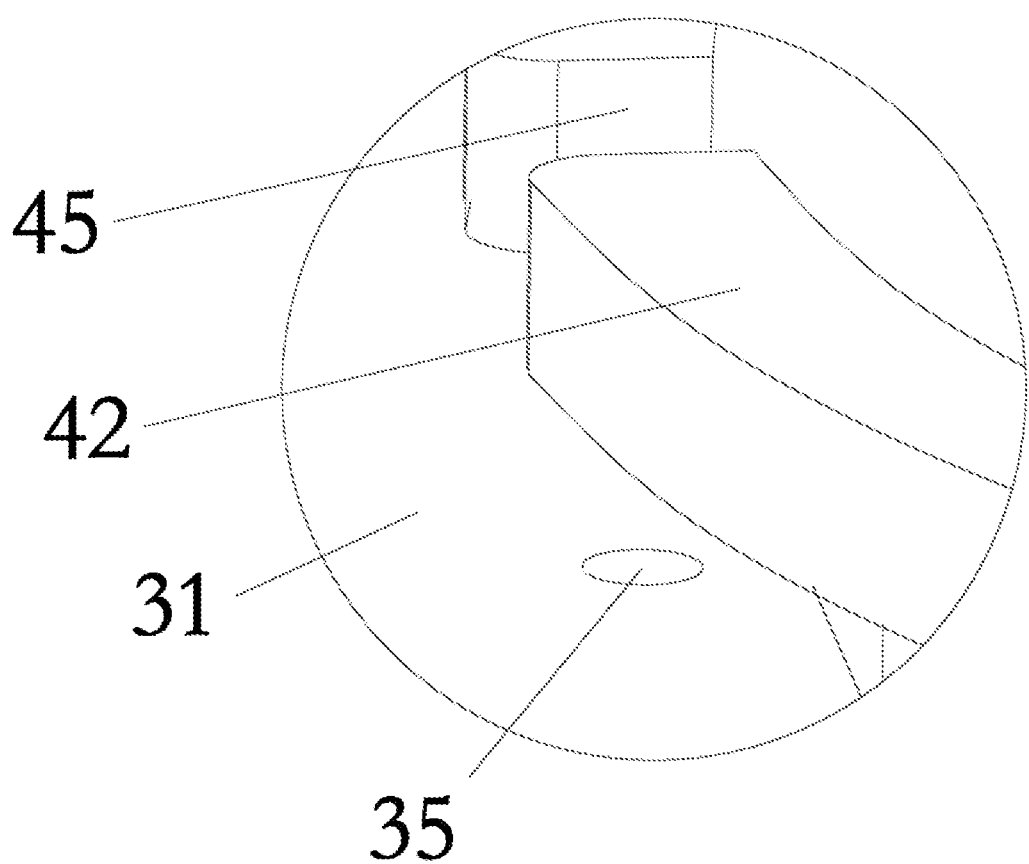
FIG. 7 shows a local enlarged schematic diagram of an "A" region in FIG. 6.

When the collecting chamber 22 is covered by the covering end 31, the cover body is inserted into the collecting chamber in a form similar to a piston, and the internal collecting chamber 22 is sealed; with the closure of the covering end 31, the air pressure in the collecting chamber 22 will be higher and higher, which will cause that the collecting chamber (not covered firmly) cannot be completely covered by the covering end 31, or the cover body is popped out due to the increase of air pressure in the collecting chamber caused by air compression after covering the covering end 31. Preferably, to remove the influence of air pressure, the sample collector 30 and/or collecting chamber 22 should be provided with a hole capable of connecting the collecting chamber 22 with the outside. For example, as shown in FIG. 7, the covering end 31 is provided with a hole 35 having a diameter less than 1 mm; the covering end 31 provided with the hole 35 may be well covered with the collecting chamber 22, such that the collecting chamber keeps air communication with the outside. The configuration of the hole 35 solves the problem of air pressure, but such a configuration makes it possible to leak fluid samples on the covering end 31. To avoid the leakage of liquid samples as much as possible, a hollow tube 36 extending towards the collecting chamber 22 is disposed on the covering end 31 in the position of hole 35, and the hollow tube 36 may still keep communication between the inner part of the collecting chamber 22 and the outside. Meanwhile, when the detecting apparatus is inverted, liquid samples will be gathered to the position of the covering end 31 under the effect of gravity, and the hollow tube 36 raises the hole in the communication position; therefore, the hole cannot be in contact with the liquid samples. That is, liquid samples cannot be leaked from the hole 35, and at the same time, the hole 35 has a small diameter and further reduces the possibility of leakage of the liquid samples due to the existence of aqueous tension.

Preferably, to squeeze out the liquid samples as many as possible when the absorbing element on the sampling end 33 squeezes the bottom of the collecting chamber 22, an extruding portion 23 is disposed at the bottom position of the collecting chamber 22; the extruding portion 23 is provided with an opening 24 which opens up; the opening 24 is in a frustoconical shape with a larger size in the upper portion and a smaller size in the lower portion. When the absorbing element on the sampling end 33 contacts with the extruding portion 23 to squeeze the sample, the absorbing element extrudes the bottom of the extruding portion 23, meanwhile, the frustoconical opening 24 can further extrude the side portion of the absorbing element, which improves the extruding efficiency and can release more liquid samples, and moreover can gather the samples to some extent.

The absorbing element is used for absorbing liquid samples here, for example, saliva, urine, sweat and other samples. The absorbing element may be made of any water absorbent materials, for example, sponge.

Preferably, the collecting chamber 22 is provided with sample grooves 25 at both sides of the extruding portion 23; the sample grooves 25 are located just below the carrier 40; a connecting groove 26 in communication the two sample grooves 25 is disposed in the central position of the extruding portion 23; when the detecting apparatus is placed flatly, the connecting groove 26 keeps the same liquid level in the two sample grooves 25. The carrier 40 is located right above the connecting groove 26, and when samples in the sample grooves 25 are gathered, the samples in the two sample grooves 25 will contact with the lower end of the test paper on the two carriers 40 for detection. The above configuration avoids that one carrier 40 has been detected, while another sample 40 has been not detected. Further, the height of the connecting groove 26 is lower than that of the extruding portion 23, such that the samples released by the extrusion of the absorbing element flow into the sample grooves 25 as many as possible.

Preferably, the collecting chamber 22 is provided with two drain ports 27 at both sides of the sample grooves 25; the drain port 27 may guide the samples which is spilt and do not fall on the position of the extruding portion 23 into the sample grooves 25.

Preferably, to make the covering end 31 covering the opening of the collecting chamber 22 better, the covering end 31 is provided with a first sealing ring 34; the first sealing ring 34 is elastic and may achieve better seal between the covering end 31 and the opening of the collecting chamber 22, thereby avoiding the outflow of liquid samples. Meanwhile, the first sealing ring 34 increases the force of friction such that the covering end 31 is hardly detached from the opening of the collecting chamber 22; when the covering end 31 covers the opening of the collecting chamber 22, the absorbing element is always in a compressed state and thus, may constantly release liquid samples to the collecting chamber 22.

Collecting Chamber and Storage Chamber

The storage chamber is used to store a treating fluid, and the treating fluid may be solid, liquid and gaseous. Common treating fluids are liquid, for example, a buffer solution; the treating fluid includes some chemical components to elute analytes on the absorbing element of the collector or mix with a sample, such that the sample flows on a test stripe easily. In this present invention, the buffer solution is separately sealed in the storage chamber 90; after the sample collector collects the sample, the storage chamber 90 needs to be opened and the buffer solution is added to the collecting chamber 22 to be mixed with the sample; then the obtained mixed liquor contacts with the test paper on the carrier 40 for detection. The sampling quantity of the sample on the absorbing element is controlled by designing a size of the absorbing element, or a size of the sample groove 25 is designed to control the quantity of the samples required while being in contact with the test paper, thus achieving the full release of the liquid sample capable of being absorbed by the absorbing element on the sample collector. But, in case of little sample absorbed, the sample located in the sample groove 25 cannot be in contact with the test paper. At this time, the obtained mixed liquor can contact with the test paper due to the increase of the total volume only when the buffer solution in the storage chamber 90 is added to the collecting chamber 22. Such a design mode can achieve more precise detection of the detecting apparatus and avoids the failure of detection because there is little sampling quantity of the absorbing element. Moreover, some analytes are easily absorbed by the collector or plastic. When a fluid sample is obtained from the collector, but the target analyte in the sample is easily absorbed on the collector, at this time, the analyte on the collector is eluted by a treating fluid to improve the accuracy of the detection.

Preferably, in this present invention, the storage chamber 90 is an individual chamber and may be separated from the collecting chamber 22; the storage chamber 90 is disposed in the second shell 91, and the second shell 91 is provided with a layer of sealing membrane 92; and the sealing membrane 92 may be selected from aluminum foil, thus sealing the buffer solution in the storage chamber 90. At this time, the membrane of the storage chamber 91 is easily pierced by the piercing element to release the treating fluid.

Figure 9:
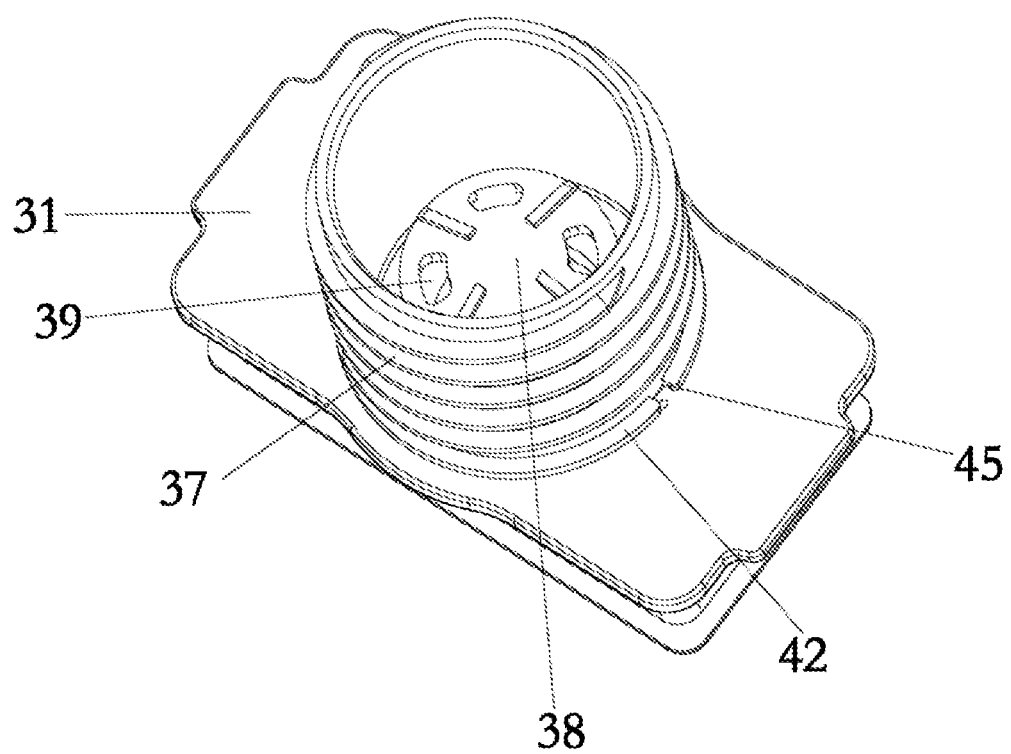
FIG. 9 is a schematic diagram showing a structure of a covering end.
Figure 10A:
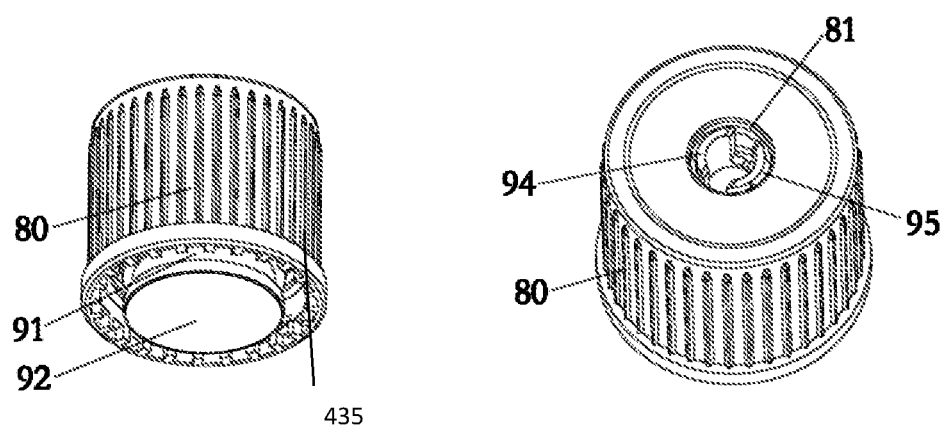
FIGS. 10A-10B are a structure diagram showing that a second shell is mounted in a cover body.
Figure 10B:
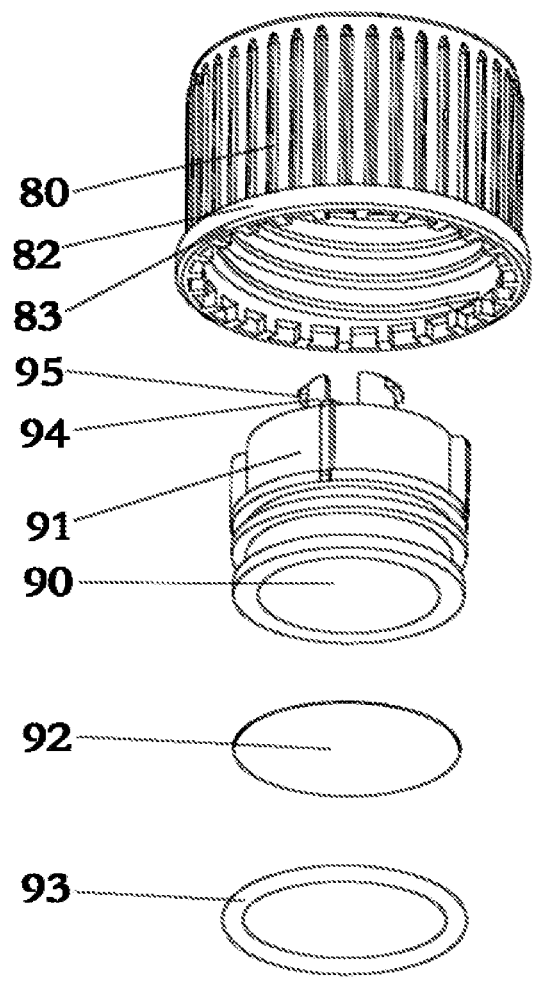
Figure 11:
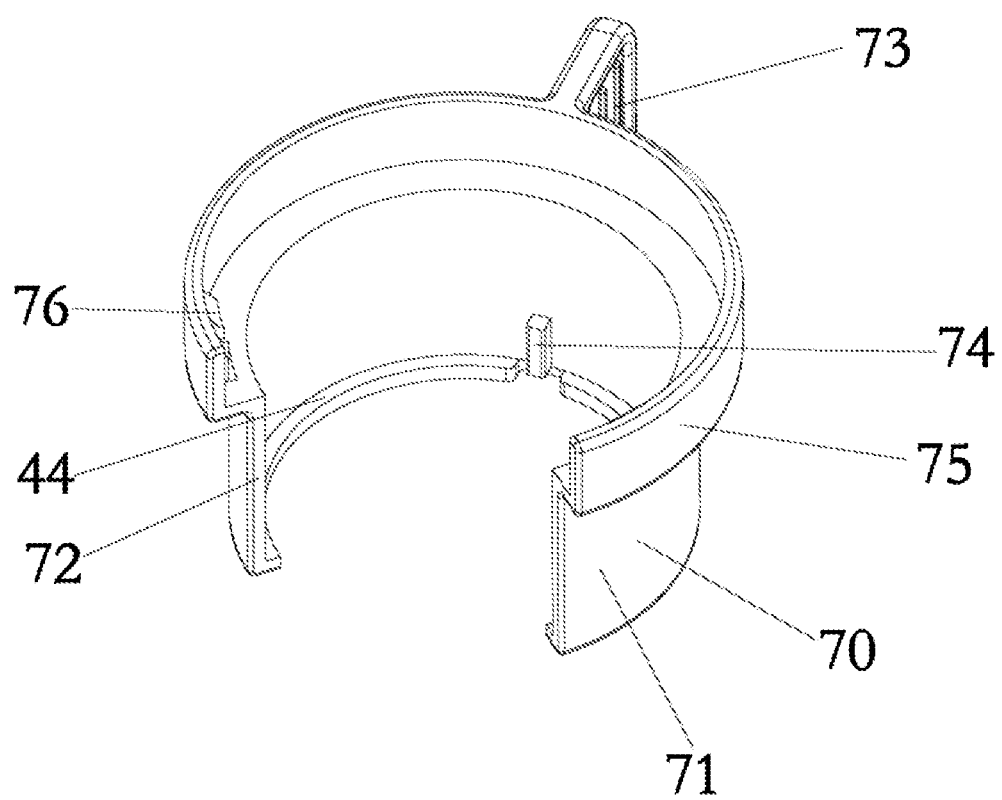
FIG. 11 is a schematic diagram showing a structure of a protecting element.

Preferably, to improve the integrity of the detecting apparatus and for the convenience of use, a connecting head 37 is disposed on the side of the covering end 31 of the sample collector 30 opposite to the rod body 32; the connecting head 37 is hollow and the second shell 91 may access to the hollow position; further, the connecting head 37 is provided with a sharp-pointed portion 38 protruding upwards in the hollow position; the sharp-pointed portion 38 is provided with through holes 39; when the side of the sealing membrane 92 on the storage chamber 91 extrudes the sharp-pointed portion 38, the sealing membrane 92 is pierced and liquid in the storage chamber 90 is leaked and flows into the collecting chamber 22 to be mixed with the sample via the through holes 39. Further, since the second shell 91 may access to the hollow position of the connecting head 37, there is a gap between the second shell 91 and the connecting head 37. The buffer solution in the storage chamber 90 may leak from the gap once the sealing membrane 92 is pierced, leading to the leakage of the buffer solution. To solve such a problem, a second sealing ring 93 is mounted on the outer surface of the second shell 91, and the sealing ring 93 should be elastic; when the second shell 91 gets into the connecting head 37, the gap between the second shell 91 and the connecting head 37 is filled by the second sealing ring 93; or the sealing ring is in contact with the side wall inside the connecting head to achieve sealing, thereby solving the leakage problem of the buffer solution. In some embodiments, one end of the collector 32 is collected with the cover body 31, and another end 33 thereof is connected with an absorbing element; the cover body 31 has a hole internally, and the connecting head 37 is a chamber structure, and the piercing element is disposed on another end of the connecting rod of the collector, for example, as shown in FIG. 9. It should be understood that the second shell 91 and the storage chamber 90 may be an integral structure; the sealing ring may be also disposed outside the second shell or outside the storage chamber 90, used for contacting with the inner wall of the connecting head 37, thereby exerting the sealing role.

After the introduction of second sealing ring 93, as the storage chamber 90 moves down and towards the hollow position of the connecting head 37, the air pressure in the storage chamber 90 will increase (the space in the connecting head 37 is in communication with the collecting chamber), which hinders the continuous downward movement of the storage chamber 90. The above covering end 31 is provided with a hole 35, which may remove the influences of the air pressure in the storage chamber 90 and also solve the potential technical problem, that is, the problem that the storage chamber 90 moves down. Generally, a cover and an end 31 (called as a cover body; the cover body is sealed via way similar to a plug instead of threads, in this way, the collector, the cover and the end are directly inserted into a chamber body 20 to extrude the absorbing element when the collector, the cover and the end are connected into an integral structure) are used to seal the opening of the chamber body 20; after the covering end is covered, the overall chamber body is in a sealing state, as shown in FIG. 6. If a sealing ring is also disposed outside the storage chamber 90, used for sealing the connecting head. In this way, when the storage chamber 90 enters into the connecting head 37, the air pressure will be increased, thereby increasing the entrance difficulty.

Cover Body

The second shell 91 may be taken out of or mounted in the connecting head 37; the second shell 91 and the connecting head 37 are two components. The detecting personnel are easy to mistake that one of the two components is useless in use if unfamiliar with the use method of the apparatus, thereby leading to the loss of the components. To solve such a problem, the integrity of the detecting apparatus needs to be enhanced such that the detecting personnel know how to use it and know that the two components should be combined in use at the first sight of the apparatus. Preferably, the detecting apparatus further includes a cover body 80; the cover body 80 is connected with the second shell 91. In some embodiments, the second shell 91 is disposed inside the cover body; a space or an interval 435 is disposed inside the shell and the cover body; when the cover body 80 and threads outside the connecting head 37 are rotated, the interval allows the connecting head 37 to get into the interval, such that the shell 91 in the cover body gets into the space of the connecting head 37. Such kind of connection mode may be detachable or non-detachable. The cover body 80 may be covered with the connecting head 37, for example, paired threads are disposed on the cover body 80 and the connecting head 37. In such way, the cover body 80 may be screwed onto the connecting head 37; during the tightening process of the cover body 80, the cover body 80 drives the second shell 91 to move towards the sharp-pointed portion 38 until the sealing membrane 92 is pierced by the sharp-pointed portion 38.

If the detecting apparatus contains a cover body 80, a second sealing ring 93 may be not disposed because the cover body 80 also may exert the leakage-proof effect to some extent. As a preferred embodiment, the detecting apparatus is still preserved with a sealing ring 93. Since when the sealing membrane 92 is pierced by the sharp-pointed portion 38, the cover body 80 is not tightly covered. Even though the cover body 80 exerts certain leakage-proof effect, leakage cannot be completely avoided. When the second shell 91 is provided with a second sealing ring 93, and the gap between the second shell 91 and the connecting head 37 is sealed by the second sealing ring 93. If the cover body 80 is non-detachably connected with the second shell 91, namely, common fixed connection, the rotation of the cover body will also drive the shell to rotate synchronously. When the cover body 80 is rotated, the second sealing ring 93 will certainly rub against the inner wall of the connecting head 37, which will greatly influence the closure of the cover body 80, such that a larger force is required to overcome the frictional force. Moreover, when the second sealing ring enters into the connecting head 37, the sealing causes air compression to increase the resistance. Therefore, the frictional resistances between the sealing ring 93 and the inner wall of the connecting head are leading factors. Therefore, in a preferred embodiment, the cover body 80 is detachably connected, or flexibly connected with the second shell 91; or preferably, the shell is connected with the cover body by the way of a relative rotational motion. In this way, when the cover body 80 is meshed with the connecting head 37 via threads, the cover body 80 and the connecting head 37 are covered with each other via mutual rotation; if the second shell 91 or the storage chamber 90 rotates together with the cover body, the cover body 80 may be rotated with great force due to the frictional force of the sealing element, which is difficult to operate. In contrast, when the cover body is rotated, the second shell 91 or the storage chamber 90 is not rotated transversely with the cover body, but moves down directly, and at this time, the cover body 80 may be rotated with less force. Specifically, for example, in this example, a rotating portion 94 is disposed on an upper end of the second shell 91, and the rotating portion 94 is provided with a first bulge 95; and the cover body 80 is provided with a connecting hole 81, and the rotating portion 94 may be inserted into the connecting hole 81 and buckled on the connecting hole 81 of the cover body via the first bulge 95, thus being connected with the cover body; while the rotating portion 94 may rotate in the connecting hole 91 to drive the second shell 91 or the storage chamber 90 to rotate on the connecting hole 81; or the shell 91 may rotate relative to the cover body 80. In such a design, when the connecting head 37 is covered by the cover body 80, due to the presence of the second sealing ring 93, the second shell 91 will move up and down equivalent to the connecting head 37 and thus, will hardly rotate in the internal connecting head, thereby reducing the friction between the sealing ring and the internal connecting head due to rotation. The second shell 91 will rotate equivalent to the cover body 80; in this way, the cover body covers on the external threads (the cover body is provided with internal threads, and the connecting head is provided with external threads) via rotation. In this way, during the rotation process of the covey body, the shell may move down only instead of rotating at the same time, which makes it easier for the cover body 80 to cover the connecting head 37. Meanwhile, the second sealing ring 93 on the shell 91 may exert better leakage-proof effect.

Protecting Element

The storage chamber 90 may be connected on the connecting head 37 via the cover body 80, for example, in this example, the cover body 80 is in threaded fit connection with the connecting head 37, and may be fixed on the connecting head 37 by several rotations slightly. But if the cover body 80 is not screwed tightly, the cover body 80 falls off from the connecting head 37 easily; but if the cover body 80 is screwed too tightly, and because the operator cannot see the location of the storage chamber 90, it easily causes that the sealing membrane 92 is pierced by the sharp-pointed portion 38 in advance, such that the buffer solution will flow into the collecting chamber in advance. If the collector is not inserted into the chamber 20 to be compressed to release liquid at this time, the buffer solution will contact with the test stripe in advance for detection, leading to inaccurate assay. It is rather difficult to find a location where the cover body 80 does not fall off and the inner storage chamber 90 is not pierced; even if such a location is found, it is easy for the detecting personnel to make a wrong operation in the premise of making how to operate the detecting apparatus unclear, for example, to carelessly screw the cover body 80 before detection, causing that the sealing membrane 92 is pierced, and then the buffer solution is released into the collecting chamber 22 in advance, leading to an incorrect detection result.

To solve such a technical problem, the detecting apparatus further includes a protecting element 70 or a controlling element; and the controlling element is similar to a form of a switch or a lock catch which may control the rotation of the cover body 80 and the number of rotations, or control the longitudinal motion height of the cover body 80 on the connecting head, such that the locking state may be actually removed in an appropriate condition and accordingly, the protecting element is taken down. The protecting element 70 is used for limiting the excessive rotation of the cover body 80, namely, limiting that the storage chamber 90 is pierced by the sharp-pointed portion 38 in advance. The protecting element 70 includes a supporting section 71, and the supporting section 71 is sleeved on the connecting head 37; a lower end of the supporting section 71 is abutted against an upper surface of the covering end 31, and an upper end of the supporting section 71 is abutted against the cover body 80. Such a configuration way may avoid the excessive rotation of the cover body 80. The supporting section 71 may be hollow and cylindrical, and is sleeved on the connecting head 37. Further, when the supporting section 71 is hollow and cylindrical, and if the sharp-pointed portion 38 is desired to pierce the storage chamber 90, the cover body 80 needs to be screwed off first, and then the protecting element 70 is taken down, and the cover body 80 is tightened, which is too complex. In this example, a first notch 72 is disposed on the supporting section 71 of the protecting element 70, and the protecting element 70 is elastic and may produce elastic deformation. In this way, the protecting element 70 may be taken down directly in case of not screwing off the cover body 80, which is convenient for the rotation of the cover body 80 to pierce the storage chamber 90. Hence, in an initial state, the protecting element 70 is clamped on the connecting head 37, and the cover body 80 is rotationally fixed on the connecting head. Due to the limitation of the protecting element 70, the cover body cannot keep rotation, and since the storage chamber 90 is flexibly connected on the cover body, the storage chamber 90 is also located in the initial position and thus, may be not pierced by the piercing element.

Preferably, for the convenience of taking down the protecting element 70, the protecting element 70 further includes a holding portion 73; and the holding portion 73 is provided with stripes, capable of increasing the friction between the detecting personnel and the holding portion 73. Further, the holding portion 73 is connected with the supporting section 71, and the connection position between the holding portion 73 and the supporting section 71 is just directly situated facing the first notch 72.

Preferably, to make the protecting element 70 mounted on the connecting head 37 more firmly, a second bulge 44 bulging inwards is disposed in the protecting element 70 at the bottom position of the supporting section 71, and the second bulge 44 may be in an annular shape; correspondingly, an annular structure 42 (FIG. 9) is also disposed in the connecting head 37 close to the bottom position; the second bulge 44 may be clamped into a gap between the annular structure 42 and the upper surface of the covering end 31, such that the protecting element 70 is firm after being mounted.

Preferably, to achieve a beautiful detecting apparatus, the position of the holding portion 73 on the protecting element 70 is upright instead of being upwards randomly; the annular structure 42 is provided with a second notch 45; correspondingly, a third bulge 74 directly situated facing the first notch 72 is disposed inside the supporting section 71 of the protecting element 70; and the third bulge 74 may be embedded into the second notch 45. Such a configuration mode may limit the random rotation of the protecting element 70 on the connecting head 37. When the second notch 45 is located at the side close to the long edge of the covering end 31, the holding portion 73 of the protecting element 70 is also located at the side close to the long edge of the covering end 31. Such a configuration mode renders that the protecting element is located in the space above the covering end, convenient for packaging.

When the protecting element 70 is mounted on the connecting head 37, the supporting section 71 of the protecting element 70 may avoid the excessive screwing in of the cover body 80, but may not exert the function of inhibiting the screwing out of the cover body 80. If the cover body 80 can be still screwed out after the protecting element 70 is mounted, the detecting personnel do not know whether the protecting element 70 is taken down or the cover body 80 is crewed out first in the premise of making how to use the detecting apparatus unclear. Preferably, a blocking wall 75 is disposed on the supporting section 71 of the protecting element 70 and is also arc-shaped corresponding to the shape of the supporting section 71. Since the cover body 80 will press upon the upper end of the supporting section 71 during the use procedure of the detecting apparatus, the inner diameter of the blocking wall 75 position is slightly greater than that of the supporting section 71 position; a buckle 76 is disposed inside the blocking wall 75; correspondingly, a circle of flange 82 is disposed at a bottom position of the cover body 80; and the flange 82 of the cover body 80 may access to the blocking wall 75 and be buckled below the buckle 76. Further, the upper end of the flange 82 is horizontal and the lower end of the buckle 76 is also horizontal; after the cover body 80 is mounted, the upper end of the flange 82 is abutted against or almost abutted against the lower end face of the buckle 76. If the detecting personnel want to unscrew the cover body 80 at this time, the flange 82 of the cover body 80 is abutted against the buckle 76; under the driving of the buckle 76, the protecting element 70 will have a trend of moving up, and the second bulge 44 of the protecting element 70 is buckled between the annular structure 42 and the covering end 31 at this time, thus causing that the protecting element 70 cannot make upward movement. Therefore, the cover body 80 cannot be unscrewed or separated from the connecting head 37, either. By such a structure design, the detecting personnel have to take down the protecting element 70 first while using the detecting apparatus. After pulling out the protecting element 70, there is only a cover body 80 on the detecting apparatus. At this time, the detecting personnel drive the storage chamber 90 to move down in the connecting head by rotating the cover body 80, thereby being pierced by the piercing element to release the buffer solution. The detecting personnel need not know the use method of the detecting apparatus and how to use the apparatus for detection in advance. Therefore, the detecting apparatus is apparent to the detecting personnel.

Preferably, the upper end of the buckle 76 is slope-shaped, and a chamfer 83 is disposed at a lower position of the flange 82 of the cover body 80. In this way, during the production and assembly process of the detecting apparatus, assembly workers sleeve the protecting element 70 on the connecting head 37 first, and pair the third bulge 74 with the position of the second notch 45, and then screw the cover body 80 on the connecting head 37. When the cover body 80 (the second shell 91 has been mounted inside the cover body 80) moves down, the chamfer 83 of the flange 82 is abutted against the upper end face (a slope) of the buckle 76. The downward movement of the cover body 80 may provide a horizontal force; and such horizontal force may slightly opens the protecting element 70 until the buckle 76 is buckled above the flange 82 of the cover body 80. While at this time, when the cover body 80 is rotated reversely, as the upper end of the flange 82 and the lower end face of the buckle 76 have a horizontal plane, a horizontal force cannot be produced therebetween. Therefore, the protecting element 70 cannot be opened, thus achieving the purpose of locking the cover body 80.

The cover body 80, the protecting element 70, the covering end 31 and the collector are independently packaged to form a collecting assembly 489; the chamber 20 and the carrier provided with test stripes are also independently packaged to form a detecting assembly 490. During detection, the collecting assembly 489 is taken out of the package first to absorb a liquid sample by the absorbing element of the collector, and then, the collector is inserted into the chamber of the detecting assembly. At this time, the absorbing element on the collector is inserted into the extruding platform 26 of the collecting chamber. Since the opening of the collecting chamber is closed by the cover and end 34, the absorbing element on the collector is extruded in the covering process, thus releasing the liquid sample to form a structure shown in FIG. 1. In case of releasing the treating fluid or buffer solution, the protecting element 70 is taken down, and the cover body 80 is continuously rotated to drive the storage chamber 90 to move down; then the sealing membrane on the storage is pierced by the piercing element disposed in the connecting head 37, thus releasing the treating fluid; the treating fluid flows into the chamber 20 to be mixed with the liquid sample; then the mixed liquor flows into the test stripe for detection.

The various examples below are also a portion of the present invention.

1. A detecting apparatus, comprising a storage chamber containing a treating fluid, wherein, the detecting apparatus is internally provided with a sharp-pointed portion; the storage chamber may make an movement relative to the sharp-pointed portion; the storage chamber will be pierced by the sharp-pointed portion during the moving process, such that the treating fluid in the storage chamber is released.
2. The detecting apparatus according to clause 1, further comprising a collecting chamber, wherein the released treating fluid may flow into the collecting chamber.
3. The detecting apparatus according to clause 2, wherein, the collecting chamber is used for holding a sample and is disposed in a first shell; and an opening is disposed at an upper position of the first shell.
4. The detecting apparatus according to clause 2, wherein, the collecting chamber is provided with a testing element for detecting an analyte.
5. The detecting apparatus according to clause 3, wherein, the testing element is disposed on a carrier, and the carrier has a specific matching form with the collecting chamber; the carrier may be inserted into the collecting chamber from the opening at the upper position of the first shell; and the carrier has a definite and unique directional position after being inserted into the collecting chamber.
6. The detecting apparatus according to clause 5, wherein, the collecting chamber is internally provided with clamping strips; and one carrier is fixed by two clamping strips; the carrier is attached to an inner wall of one side of the collecting chamber on a side where the testing element is provided.
7. The detecting apparatus according to clause 6, wherein, each clamping strip has a smaller thickness in the upper end and has a greater thickness in the lower end; correspondingly, the carrier has a smaller thickness in the bottom position and has a greater thickness in the top position.
8. The detecting apparatus according to clause 5, wherein, a corner position of the collecting chamber is provided with filleted corners; correspondingly, filleted corners are also disposed on the carrier at both sides of the face provided with the testing element.
9. The detecting apparatus according to clause 3, further comprising a sample collector for collecting a sample; wherein the sample collecting chamber comprises a covering end, and the covering end may be used to cover an opening of the collecting chamber.
10. The detecting apparatus according to clause 1, wherein, the sample collector further comprises a sampling end and a rod body; the sampling end is connected with the absorbing element; the rod body is used for connecting the covering end with the sampling end, and the rod body is detachably or integrally connected with the covering end.

11. The detecting apparatus according to clause 9, wherein, a hole is disposed on the sample collector and/or collecting chamber, such that the collecting chamber is in air communication with the outside.

12. The detecting apparatus according to clause 11, wherein, a hollow tube extending towards the collecting chamber is disposed at the hole position of the covering end.

13. The detecting apparatus according to clause 11, wherein, the hole has a diameter less than 1 mm.

14. The detecting apparatus according to clause 1, wherein the treating fluid in the storage chamber is a buffer solution.

15. The detecting apparatus according to clause 9, wherein, a connecting head is disposed on one side of the covering end of the sample collector opposite to the rod body; the connecting head is hollow, and the storage chamber may access to the hollow position thereof.

16. The detecting apparatus according to clause 15, wherein, the sharp-pointed portion shows a protruding shape, and is disposed at the hollow position of the connecting head.

17. The detecting apparatus according to clause 16, wherein, the storage chamber is disposed in a second shell; the second shell is provided with a layer of sealing membrane, used for sealing the treating fluid in the storage chamber; and the storage chamber enters into the hollow position of the connecting head, and the sharp-pointed portion may pierce the sealing membrane on the second shell, thus releasing the treating fluid in the storage chamber.

18. The detecting apparatus according to clause 16, wherein, the sharp-pointed portion is provided with a through hole.

19. The detecting apparatus according to clause 17, wherein, the second shell is provided with a second sealing ring, and the second sealing ring may fill a gap between the second shell and the connecting head.

20. The detecting apparatus according to clause 17, wherein, the detecting apparatus further includes a cover body; the cover body is connected with the second shell; such a connection relation is detachable or non-detachable.

21. The detecting apparatus according to clause 20, wherein, the cover body may be mutually covered with the connecting head.

22. The detecting apparatus according to claim 21, wherein, paired threads are disposed on the cover body and the connecting head.

23. The detecting apparatus according to clause 20, wherein, a rotating portion is disposed on an upper end of the cover body and the second shell; the rotating portion is provided with a first bulge; and the cover body is provided with a connecting hole; the rotating portion may be inserted into the connecting hole and buckled on the connecting hole via the first bulge, such that the second shell may rotate on the connecting hole.

24. The detecting apparatus according to clause 20, wherein, the detecting apparatus further comprises a protecting element used for limiting excessive closure of the cover body.

25. The detecting apparatus according to clause 24, wherein, the protecting element comprises a supporting section, the supporting section is sleeved on the connecting head; a lower end of the supporting section may be abutted against an upper surface of the covering end, and an upper end of the supporting section may be abutted against the cover body.

26. The detecting apparatus according to clause 25, wherein, the supporting section is hollow and cylindrical, and is sleeved on the connecting head.

27. The detecting apparatus according to clause 25, wherein, a first notch is disposed on the supporting section of the protecting element.

28. The detecting apparatus according to clause 24, wherein, the protecting element is elastic.

29. The detecting apparatus according to clause 27, wherein, the protecting element further comprises a holding portion provided with stripes; the holding portion is connected with the supporting section; and the connection position between the holding portion and the supporting section is just directly situated facing the first notch.

30. The detecting apparatus according to clause 25, wherein, a second bulge bulging inwards is disposed in the protecting element at the bottom position of the supporting section, and the second bulge is in an annular shape; correspondingly, an annular structure is also disposed in the connecting head close to the bottom portion; the second bulge may be clamped into a gap between the annular structure and the upper surface of the covering end.

31. The detecting apparatus according to clause 30, wherein, the annular structure is provided with a second notch; correspondingly, a third bulge directly situated facing the first notch is disposed inside the supporting section of the protecting element; and the third bulge may be embedded into the second notch.

32. The detecting apparatus according to clause 31, wherein, the covering end is in a rectangular shape; and the second notch is located at one side close to the long edge of the covering end.

33. The detecting apparatus according to clause 26, wherein, a blocking wall is disposed on the supporting section of the protecting element and is arc-shaped.

34. The detecting apparatus according to clause 33, wherein, an inner diameter of the protecting element in the position of the blocking wall is greater than an inner diameter of the protecting element in the position of the supporting section.

35. The detecting apparatus according to clause 33, wherein, a buckle is disposed inside the blocking wall; a circle of flange is disposed at a bottom position of the cover body; and the flange of the cover body may access to the blocking wall and be buckled below the buckle.

36. The detecting apparatus according to clause 35, wherein, the upper end of the flange is horizontal and the lower end of the buckle is also horizontal; the upper end of the buckle is slope-shaped, and a chamfer is disposed at a lower position of the flange of the cover body.

What is described above are detailed embodiments of the present invention, but the protection scope of the present invention is not limited thereto. Any change or replacement envisaged without inventive efforts shall fall within the protection scope of the present invention. Therefore, the protection scope of the present invention shall be subjected to the protection scope defined in the claims.

The present invention as shown and set forth in this text may be achieved in case of lacking any element and limitation disclosed herein specifically. Terms and expression methods used herein are used for description, but not for limitation. Further, it is undesired that any equivalent of the features or a portion thereof as shown or set forth herein is excluded in the use of these terms and expression methods; moreover, a person skilled in the art should realize that various modifications are feasible within the scope of the present invention. It should therefore be understood that, although the present invention has been specifically disclosed through various embodiments and optional characteristics, modifications and variations of concepts described herein may be employed by ordinary technicians skilled in the art, and these modifications and variations are considered to fall within the scope of the present invention defined by the attached claims.

The content of articles, patents, patent applications and all other documents and electronically available information described or documented herein is incorporated in the full text to some extent for reference, as if each individual publication is specifically and individually pointed out for reference. The Applicant reserves the right to incorporate any and all materials and information from this article, patent, patent application or other documents into the present application.

The invention claimed is:

1. A detecting apparatus, comprising:
   a storage chamber containing a treating fluid; and
   a sharp-pointed portion, wherein the storage chamber can be moved relative to the sharp-pointed portion; the storage chamber can be pierced by the sharp-pointed portion during the moving process of the storage chamber, such that the treating fluid in the storage chamber is released from the storage chamber,
   wherein the detecting apparatus further comprises a sample collector for collecting a sample, wherein the sample collector comprises a covering end, and the covering end is used to cover an opening of a collecting chamber,
   wherein the sample collector further comprises a sampling end and a rod body, the sampling end is connected with an absorbing element, one end of the rod body is used for connecting the covering end, and another end of the rod body is connected with the sampling end, the rod body is detachably or integrally connected with the covering end,
   wherein a connecting head is disposed on one side of the covering end of the sample collector opposite to the rod body, the connecting head comprises a chamber, and the storage chamber has access to the chamber, wherein the sharp-pointed portion is also located in the chamber of the connecting head.

2. The detecting apparatus according to claim 1, wherein, the apparatus further comprises a shell, and the storage chamber is disposed in the shell; the shell is provided with a layer of sealing membrane, used for sealing the treating fluid in the storage chamber.

3. The detecting apparatus according to claim 2, wherein, the shell is provided with a sealing ring; the sealing ring is in contact with an inner wall of the connecting head, thus forming a sealing structure.

4. The detecting apparatus according to claim 2, wherein, the detecting apparatus further comprises a cover body, and the cover body is flexibly connected with the shell; when the cover body makes a rotation motion, the shell will not synchronously rotate with a second shell.

5. The detecting apparatus according to claim 4, wherein, the cover body is mutually covered with the connecting head via a thread.

6. The detecting apparatus according to claim 4, wherein, a rotating portion is disposed on an upper end of the shell; the cover body is provided with a connecting hole; the rotating portion is inserted into the connecting hole, such that the second shell freely rotates in the connecting hole.

7. The detecting apparatus according to claim 6, wherein, the rotating portion is provided with a bulge and buckled into the connecting hole of the cover body via the bulge.

8. The detecting apparatus according to claim 2, wherein, the detecting apparatus further comprises a protecting element used for limiting excessive closure of the cover body.

9. The detecting apparatus according to claim 8, wherein, the protecting element comprises a supporting section, the supporting section is sleeved on the connecting head; a lower end of the supporting section is abutted against an upper surface of the covering end, and an upper end of the supporting section is abutted against the cover body.

10. The detecting apparatus according to claim 9, wherein, the supporting section is hollow and cylindrical, and is sleeved on the connecting head.

11. The detecting apparatus according to claim 9, wherein, a first notch is disposed on the supporting section of the protecting element.

12. The detecting apparatus according to claim 9, wherein, the protecting element is elastic.

13. The detecting apparatus according to claim 9, wherein, the protecting element further comprises a holding portion provided with stripes; the holding portion is connected with the supporting section; and the connection position between the holding portion and the supporting section is just directly situated facing the first notch.

14. The detecting apparatus according to claim 9, wherein, a second bulge bulging inwards is disposed in the protecting element at the bottom position of the supporting section, and the second bulge is in an annular shape; correspondingly, an annular structure is also disposed in the connecting head close to the bottom portion; the second bulge is clamped into a gap between the annular structure and the upper surface of the covering end.

15. The detecting apparatus according to claim 9, wherein, the annular structure is provided with a second notch; correspondingly, a third bulge directly situated facing the first notch is disposed inside the supporting section of the protecting element; and the third bulge is embedded into the second notch.

16. The detecting apparatus according to claim 15, wherein, the covering end is in a rectangular shape; and the second notch is located at one side close to the long edge of the covering end.

17. The detecting apparatus according to claim 15, wherein, a blocking wall is disposed on the supporting section of the protecting element and is arc-shaped.

* * * * *